United States Patent [19]
Witte

[11] Patent Number: 4,891,887
[45] Date of Patent: Jan. 9, 1990

[54] HAND HELD DRILL DRIVE

[76] Inventor: Karl Witte, 110 S. Hale, Bartlett, Ill. 60103

[21] Appl. No.: 213,825

[22] Filed: Jun. 30, 1988

[51] Int. Cl.[4] .............................................. B23F 1/16
[52] U.S. Cl. ....................................... 30/366; 408/67; 408/228; 408/229; 30/353; 30/358
[58] Field of Search ................. 408/67, 227, 228, 229; 29/DIG. 94; 144/352 R; 30/366, 358, 353, 164.8; 76/101 D

[56] References Cited

U.S. PATENT DOCUMENTS

| | | | |
|---|---|---|---|
| 225,004 | 3/1880 | Fairbanks | 76/101 D |
| 881,856 | 3/1908 | Hagstrom | 408/67 |
| 2,046,840 | 7/1936 | Phillips et al. | 76/101 D |
| 2,161,062 | 6/1939 | Killgore | 76/108 R |
| 2,640,379 | 6/1953 | Graves | 408/228 |
| 3,028,781 | 4/1962 | Muenchinger | 76/101 D |
| 3,276,820 | 10/1966 | Ditson | 76/108 R |
| 4,479,555 | 10/1984 | Grossmann et al. | 408/56 X |
| 4,556,347 | 12/1985 | Barish | 408/230 |
| 4,592,560 | 6/1986 | Neumaier et al. | 279/81 |

FOREIGN PATENT DOCUMENTS

| | | | |
|---|---|---|---|
| 2524340 | 12/1976 | Fed. Rep. of Germany | 408/228 |
| 46617 | 7/1936 | France | 76/101 D |
| 40 | 1/1878 | United Kingdom | 76/101 D |
| 877157 | 9/1961 | United Kingdom | 30/366 |

Primary Examiner—Z. R. Bilinsky
Assistant Examiner—Robert Schultz
Attorney, Agent, or Firm—Douglas B. White

[57] ABSTRACT

There is provided a hand held and hand operated drill for installing ceiling hooks or other mounting apparatus to a ceiling constructed of plasterboard. The present device collects the falling material cut away by the drilling process in a collection cup mounted on the drill. The device is a one piece plastic molded tool having a handle portion for applying pressure and a reciprocal rotation, a collection dish mounted to a shaft, and cutting blades tapered to a point and honed to an edge for scraping during the reciprocal rotation.

1 Claim, 1 Drawing Sheet

HAND HELD DRILL DRIVE

BACKGROUND OF THE INVENTION

1. Field of the Invention

This invention relates generally to drilling devices, and more particularly to devices adapted for the drilling of plasterboard constructed ceilings.

2. Description of the Prior Art

When installing ceiling hooks or other mounting apparatus to a ceiling constructed of plasterboard it is the usual practice to drill a hole therein. When using conventional powered or non-powered drills, the operation is difficult due to the awkward position of the drill. Moreover, while the drilling requires the individual to set-up the equipment to perform the operation, that chore often becomes incidental to the clean up required when dust and particulate matter falls and disperses throughout the immediate vicinity. No device has been developed to date which provides an efficient hand held and hand operated drill which requires no set up and also collects the falling material cut away by the drilling process.

SUMMARY OF THE INVENTION

It is accordingly a principal object of the present invention to provide a hand held drill device for use in drilling holes in plasterboard ceilings which requires no set up or other tools to operate.

It is a further object of the present invention to provide a hand held drill device which collects falling debris during the drilling process.

Generally there is provided a one piece plastic molded device having a handle portion for applying a reciprocal rotation, a collector dish, a shaft portion, and a cutting portion comprising angled blades for scraping during the reciprocal rotation.

While the invention will be described in connection with a preferred embodiment, it will be understood that I do not intend to limit the invention to that embodiment. On the contrary, I intend to cover all alternatives, modifications, and equivalents as may be included within the spirit and scope of the invention as defined by the appended claims.

DESCRIPTION OF THE PREFERRED EMBODIMENT

Figure 1:
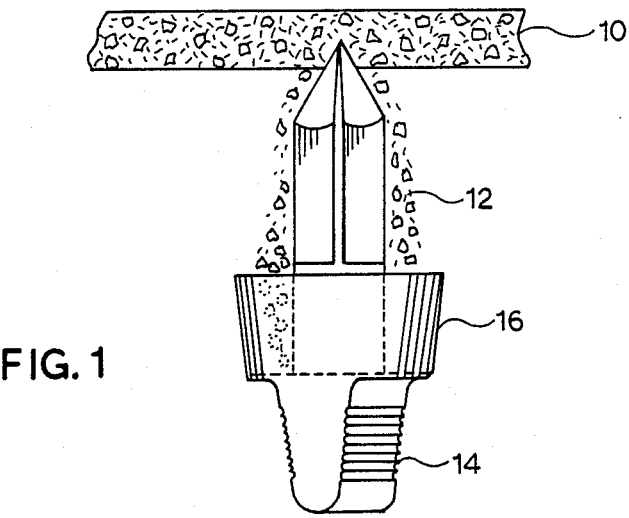
FIG. 1 depicts the hand held drill device of the present invention being used to create a hole in a plasterboard ceiling and collecting falling material from the hole.
Figure 2:
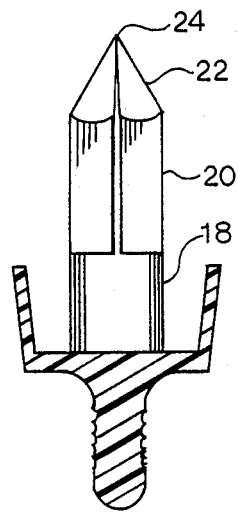
FIG. 2 is a side view, in partial cross section, showing the hand held drill device of FIG. 1.

Turning first to FIG. 1 the drill device of the present invention is depicted in operation, drilling a hole though a plasterboard ceiling 10 and particulate matter, dust and debris 12 is shown falling from the drilling operation.

Figure 3:
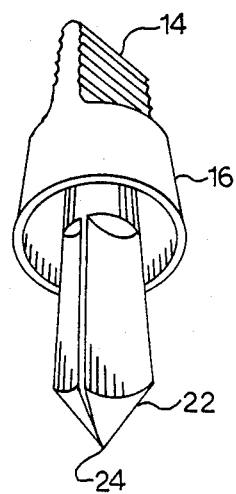
FIG. 3 is a perspective view of the hand held drill device showing the scraping blades and collection cup.

This drill device is generally of a one piece molded plastic construction displaying four basic functional members. A handle member 14 having a roughened surface is formed at one extremity for an operator to grasp and impart pressure and reciprocal rotation. A cup member 16 arranged to circumscribe the hole being drilled is provided to collect falling debris within the cavity. Within the cup and affixed through the cup to the handle, there is provided a shaft 18. Blades 20 having a honed edge 22 project from the upper extremity of the shaft and exhibit a taper to a point 24 at the working end thereof. The blades 20 also define longitudinal grooves along the shaft 18 as shown in FIG. 3.

In operation, an individual grasps the handle portion and presses the drill to the desired location to pierce the plasterboard and penetrate the surface slightly. A reciprocal rotation is then imparted under light pressure whereby the tapered honed edges are caused to scrape against the material and open a hole there through.

From the foregoing description, it will be apparent that modifications can be made to the apparatus and method for using same without departing from the teaching of the present invention. Accordingly the scope of the invention is only to be limited as necessitated by the accompanying claims.

I claim:

1. A hand held hole scraping device for penetrating a hole through scrapable material comprising:
   a shaft having a working extremity;
   a cup spaced from said working extremity of said shaft and integral with said shaft for collecting debris;
   a plurality of radially disposed blades formed integrally with said shaft, said blades exhibiting edges operative to cause scraping action when the shaft is rotated, and said blades defining longitudinal grooves along said shaft between said blades;
   a handle formed integrally with said shaft at its end opposite said working extremity, wherein said handle presents a transversely disposed roughened planar surface for operatively grasping said handle between the thumb and finger; and wherein said shaft member, blades, cup member and handle are formed as a one piece plastic molded object.

* * * * *